(12) United States Patent
Saisho et al.

(10) Patent No.: US 6,818,354 B2
(45) Date of Patent: Nov. 16, 2004

(54) NONAQUEOUS ELECTROLYTE SECONDARY CELL

(75) Inventors: Keiji Saisho, Hyogo (JP); Hiroshi Watanabe, Sumoto (JP); Ikuro Nakane, Sumoto (JP); Satoshi Narukawa, Sumoto (JP); Norio Tsujioka, Otsu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 220 days.

(21) Appl. No.: 10/024,393

(22) Filed: Dec. 21, 2001

(65) Prior Publication Data

US 2002/0146619 A1 Oct. 10, 2002

(30) Foreign Application Priority Data

Dec. 22, 2000 (JP) ........................... 2000-389685

(51) Int. Cl.⁷ .............................................. H01M 02/18
(52) U.S. Cl. .................. 429/247; 429/145; 429/231.95; 429/129
(58) Field of Search .......................... 429/61, 129, 138, 429/145, 247, 231.95

(56) References Cited

U.S. PATENT DOCUMENTS

| | | | | |
|---|---|---|---|---|
| 4,743,520 A | * | 5/1988 | Rosansky | 429/94 |
| 5,453,333 A | * | 9/1995 | Takauchi et al. | 429/62 |
| 5,681,357 A | * | 10/1997 | Eschbach et al. | 29/623.5 |
| 5,851,693 A | * | 12/1998 | Sano et al. | 429/174 |

FOREIGN PATENT DOCUMENTS

| | | |
|---|---|---|
| JP | 10-330521 A | 12/1998 |
| JP | 2001-001410 A | 1/2001 |
| JP | 2001-006739 A | 1/2001 |
| JP | 2001-07292 A | 3/2001 |
| JP | 2001-072788 A | 3/2001 |
| JP | 2001-138455 A | 5/2001 |
| JP | 2001-162742 A | 6/2001 |

\* cited by examiner

*Primary Examiner*—Gregg Cantelmo
(74) *Attorney, Agent, or Firm*—Westerman, Hattori, Daniels & Adrian, LLP

(57) ABSTRACT

In a non-aqueous secondary cell having a positive electrode, a negative electrode, a nonaqueous electrolyte, a separator interposed between the positive electrode and the negative electrode, the positive electrode having a positive electrode active material including a chemical compound capable of reversibly intercalating lithium and the negative electrode having a negative electrode active material including a material capable of reversibly intercalating lithium, the separator has through holes formed therein for passing lithium dendrites therethrough.

10 Claims, 12 Drawing Sheets

NONAQUEOUS ELECTROLYTE SECONDARY CELL

BACKGROUND OF THE INVENTION

1. Field of the Invention

The present invention relates to a nonaqueous electrolyte secondary cell using a nonaqueous electrolyte and positive and negative electrode active materials that are capable of reversibly intercalating lithium ions, and more particularly, to a nonaqueous electrolyte secondary cell having improved safety.

2. Description of the Prior Art

In recent years, rapid advancements in size reduction and weight reduction of mobile information terminals, such as mobile telephones and notebook computers, have created an increasing demand for nonaqueous electrolyte secondary cells, which are lightweight and have high capacity.

Nonaqueous electrolyte secondary cells perform charge and discharge by migration of lithium between the positive electrode and the negative electrode. Generally, nonaqueous electrolyte secondary cells use a carbon-based material that is capable of reversibly intercalating lithium ions (for the negative electrode active material), a transition metal oxide such as lithium cobalt oxide, lithium nickel oxide, lithium manganese oxide, and the like (for the positive electrode active material), and a nonaqueous electrolyte containing a lithium salt. Such nonaqueous electrolyte secondary cells exhibit excellent charge-discharge characteristics insofar as charge and discharge are performed in an appropriate range.

However, when the cells are overcharged, the lithium ions that cannot be stored in the negative electrode deposit on the negative electrode in the form of lithium metal, and the deposit develops into dendrites. The developed dendrites pierce through the separator and reach the positive electrode, causing an internal short circuit. In conventional nonaqueous electrolyte secondary cells, the dendrites fully grow and quickly pierce through the separator. This causes great damage to the separator and the resulting internal short circuit cause the cell temperature to rise to such a degree that cell performance is degraded.

Moreover, overcharge causes the positive electrode potential to increase (for example, to exceed more than 5 V), and as a result, decomposition of the electrolyte solution occurs on the positive electrode. Decomposition of the electrolyte solution induces a shortage of electrolyte solution and an increase of cell internal pressure, and when the cell temperature increase mentioned above occurs in addition to these, the electrode active materials and the electrolyte solution react violently.

In view of this problem, conventional nonaqueous electrolyte secondary cells incorporate, in order to ensure safety of the cells, separately-produced protective circuits such that, for example, electric current is cut off when cell voltage excessively increases. Such incorporation of protective circuits, however, increases the cost of the cells and moreover impedes reductions in size and weight of the cells.

SUMMARY OF THE INVENTION

In view of the foregoing and other problems in the prior art, it is an object of the present invention to improve safety of a cell, without incorporating a separately-produced protective circuit therein, by effectively utilizing an internal short circuit induced by dendrites of lithium metal, which is a mechanism inherent to the cell.

It is another object of the invention to improve safety of a cell while achieving reductions in size, weight, and cost of the cell, by self-containedly suppressing an increase in cell temperature and gas formation that is caused by overcharge without using special components.

These and other objects are accomplished in accordance with the present invention by providing a nonaqueous electrolyte secondary cell comprising a positive electrode, a negative electrode, a nonaqueous electrolyte, a separator interposed between the positive electrode and the negative electrode, the positive electrode having a positive electrode active material comprising a chemical compound capable of reversibly intercalating lithium and the negative electrode having a negative electrode active material comprising a material capable of reversibly intercalating lithium, wherein the separator has through holes for passing lithium dendrites therethrough.

In cases where a cell is overcharged and thereby lithium is released from the positive electrode in an amount exceeding the capacity of the negative electrode or where charge is performed in a low temperature condition in which the reactivity of the negative electrode is decreased, lithium dendrites deposit on the negative electrode. When the lithium dendrites pass through the separator and connect the positive electrode and the negative electrode to allow electrical contact therebetween at an initial stage of the lithium dendrite formation (before the dendrites fully grow), a short circuit is caused and thereby charge reaction does not further proceed. In addition, since the lithium dendrites are small in diameter at this stage, safety problems caused by, for example, increases in cell voltage and cell temperature, are suppressed.

Thus, as described above, when the separator has through holes for passing lithium dendrites therethrough, electrical contact between the positive electrode and the negative electrode is established at the initial stage of lithium dendrite formation, and consequently, safety of the cell is maintained.

In the above-described nonaqueous electrolyte secondary cell, the through holes may have a substantially straight line-shape and the positive electrode and the negative electrode may be connected thereby.

When the through holes have a substantially straight line-shape and the positive electrode and the negative electrode are connected thereby, lithium dendrites can smoothly grow and thereby electrical contact between the positive electrode and the negative electrode is formed at an earlier stage of lithium dendrite formation. Thus, safety of the cell is further improved.

In the above-described nonaqueous electrolyte secondary cell, the through holes may be such that the positive electrode and the negative electrode are connected in the shortest possible distance.

This configuration makes it possible to form electrical contact between the positive electrode and the negative electrode at an even earlier stage of lithium dendrite formation, and accordingly, safety of the cell is even further improved.

In the above-described nonaqueous electrolyte secondary cell, the through holes may have a diameter of 5 $\mu$m or greater When the diameter of the through holes is 5 $\mu$m or greater, the positive electrode and the negative electrode are easily connected even when the lithium dendrites grow significantly in a transverse direction (in a direction parallel to the substrate).

In the above-described nonaqueous electrolyte secondary cell, the through holes may have a diameter of 100 $\mu$m or less, and preferably 70 $\mu$m or less.

When the diameter of the through holes is 100 $\mu$m or less, the possibility of occurrences of internal short circuits is reduced under normal conditions of use (not in overcharge conditions or the like). When the diameter of the through holes is 70 $\mu$m or less, it is ensured that internal short circuits are prevented under normal conditions of use.

In the above-described nonaqueous electrolyte secondary cell, the through holes may have a diameter of 50 $\mu$m or less.

When the diameter of the through holes is 50 $\mu$m or less, a shutdown mechanism smoothly works in which the separator, which is composed of a microporous film made of polyethylene or polypropylene, melts in cases where a cell temperature increase occurs and thereby prevents current flow between the positive electrode and the negative electrode. As a consequence, safety of the cell is further improved.

In the above-described nonaqueous electrolyte secondary cell, the through holes may have a diameter of 30 $\mu$m or less.

When the through holes have a diameter of 30 $\mu$m or less, cell degradation due to self-discharge can be suppressed, and accordingly, when the cell is stored at high temperature, cell voltage variation and cell thickness increase are small.

In the above-described nonaqueous electrolyte secondary cell, the through holes may be provided at a density of 1 through hole per square centimeter or more.

When the through holes are present at a density of 1 through hole/cm$^2$ or more, it is possible to provide the electrical contact that is caused by the lithium dendrites formed randomly on the negative electrode at an earlier stage of the dendrite formation. In addition, since the number of the positions where electrical contact is formed is greater, each of the positions where the electrical contact is formed has a smaller load. Therefore, safety of the cell is further improved.

The above-described nonaqueous electrolyte secondary cell may further have a conductive polymer provided between the separator and the positive and negative electrode active materials.

In secondary cells, as charge-discharge cycles are repeated, deposit is produced by detachment of the active materials from the electrode plates and decomposition of the electrolyte solution. The deposit blocks the through holes in the separator and prevents the electrical contact that is formed by the lithium dendrites. When, as in the above-described configuration, a conductive polymer is present between the separator and the active materials, the deposition of the detached materials and the like does not occur and therefore, even when charge-discharge cycles are repeated, the electrical contact can be maintained at the same level as that of the cell in the initial condition immediately after the fabrication.

The present invention also provides a nonaqueous electrolyte secondary cell comprising a positive electrode, a negative electrode, a nonaqueous electrolyte, a separator interposed between the positive electrode and the negative electrode, the positive electrode having a positive electrode active material comprising a chemical compound capable of reversibly intercalating lithium and the negative electrode having a negative electrode active material comprising a material capable of reversibly intercalating lithium, wherein the separator comprises through holes having a diameter of 5 $\mu$m or greater.

In the above-described nonaqueous electrolyte secondary cell, the through holes may have a diameter of 100 $\mu$m or less, and more preferably have a diameter of 70 $\mu$m or less.

In the above-described nonaqueous electrolyte secondary cell, the through holes may have a diameter of 50 $\mu$m or less.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

EMBODIMENT

A non-aqueous electrolyte secondary cell of the present embodiment was fabricated in the following manner.

Preparation of Positive Electrode

Lithium carbonate ($Li_2CO_3$) and cobalt oxide ($Co_3O_4$) were calcined at 700–900° C. to prepare a positive electrode active material, lithium cobalt oxide ($LiCoO_2$). The prepared lithium cobalt oxide was mixed with graphite, ketjen black, and fluororesin at a mass ratio of 90:3:2:5. Graphite and ketjen black serve as conductivity enhancers, and fluororesin serves as a binder. The mixture was then dissolved in N-methyl-2-pyrrolidone (NMP) to obtain an active material paste.

The obtained active material paste was uniformly coated onto opposite surfaces of an aluminum foil (metal substrate) with a thickness of 20 $\mu$m by a doctor blade method, and thereafter, the substrate with the paste was made to pass through the inside of a heated dryer to vacuum-dry at 100–150° C. in order to remove an organic solvent required in the step of preparing the paste. Following this, the electrode plate was rolled with the use of a roll press machine so that the thickness of the electrode plate is made 0.17 mm, and thus, a positive electrode was fabricated.

Preparation of Negative Electrode

A negative electrode active material made of natural graphite, which is capable of reversibly intercalating lithium ions, and fluororesin, serving as a binder, were mixed at a mass ratio of 95:5, and the mixture was dissolved in N-methyl-2-pyrrolidone to obtain a paste. The obtained paste was uniformly coated onto opposite surfaces of a copper foil (thickness: 20 μm) serving as a metal substrate, and the substrate with the paste was made to pass through the inside of a heated dryer to vacuum dry at 100–150° C. in order to remove an organic solvent required in the step of preparing the paste. Following this, the electrode plate was rolled with the use of a roll press machine so that the thickness of the electrode plate is made 0.14 mm, and thus, a negative electrode was fabricated.

Preparation of Separator

Figure 7A:
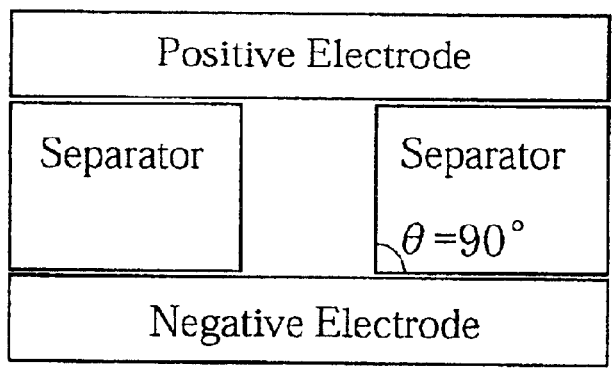
FIGS. 7A to 7D are schematic views showing orientations of through holes in a cell A and cells D1 to D3 according to the present invention.

Silica powder in which ester has been adsorbed on the surface thereof was mixed with polyethylene powder, and the mixture was then formed into a film by melt extrusion to obtain a sheet having a thickness of 200 μm. Then, the thus-obtained sheet was soaked in a 20% caustic soda aqueous solution and an organic solvent to extract and remove the silica power and ester, and thereafter rinsed with water and dried. The film was subsequently drawn in the machine direction (MD) and in the transverse direction (TD), and thus a microporous film made of polyethylene and having a thickness of 20 μm was obtained. In the thus-obtained microporous film made of polyethylene, through holes were formed using a KrF excimer laser having an oscillation wavelength of 248 nm and a stainless steel mask that had microholes with a diameter of 10 μm. The orientation, diameter, and density of the through holes thus made were as follows:

Orientation of through holes: an orientation such that the positive electrode and the negative electrode are connected in the shortest possible distance (as shown in FIG. 7A, the angle θ with respect to the surface of the negative electrode is 90°)

Diameter of through holes: 10 μm

Density of through holes: 2 through holes/cm$^2$

Preparation of Electrolyte Solution

Ethylene carbonate (EC) and diethyl carbonate (DEC) were mixed at a volume ratio of 3:7 to prepare a mixed solvent, and LiPF$_6$ (electrolyte salt) was dissolved in the mixed solvent at a concentration of 1 mol/liter. Thus, an electrolyte solution was prepared.

Production of Cell Case

Using a laminate sheet in which a polyethylene terephthalate film, an aluminum film, and so forth are layered, a cylindrical-shaped outer container was fabricated, which serves as a cell case.

Assembling of Cell

Figure 1:
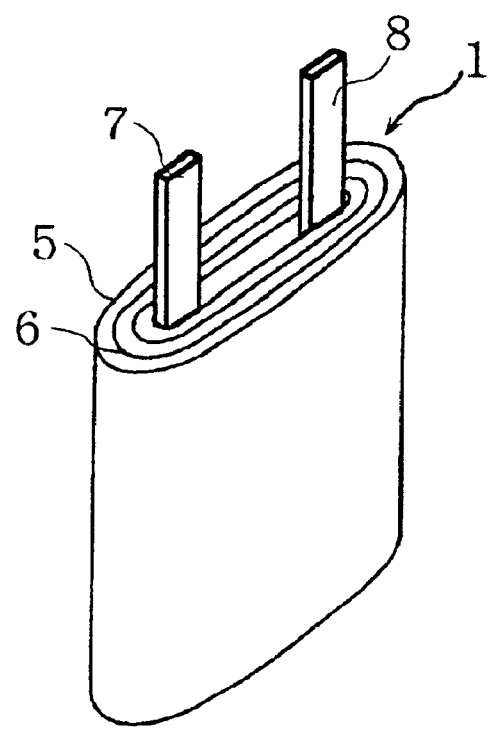
FIG. 1 shows a plate-like spirally wound electrode assembly according to Embodiment 1.
Figure 2:
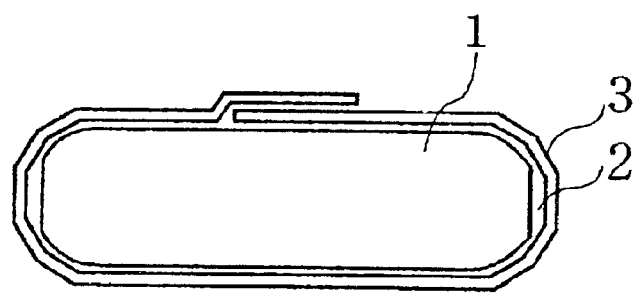
FIG. 2 is a cross-sectional view showing a laminate outer can of Embodiment 1.
Figure 3:
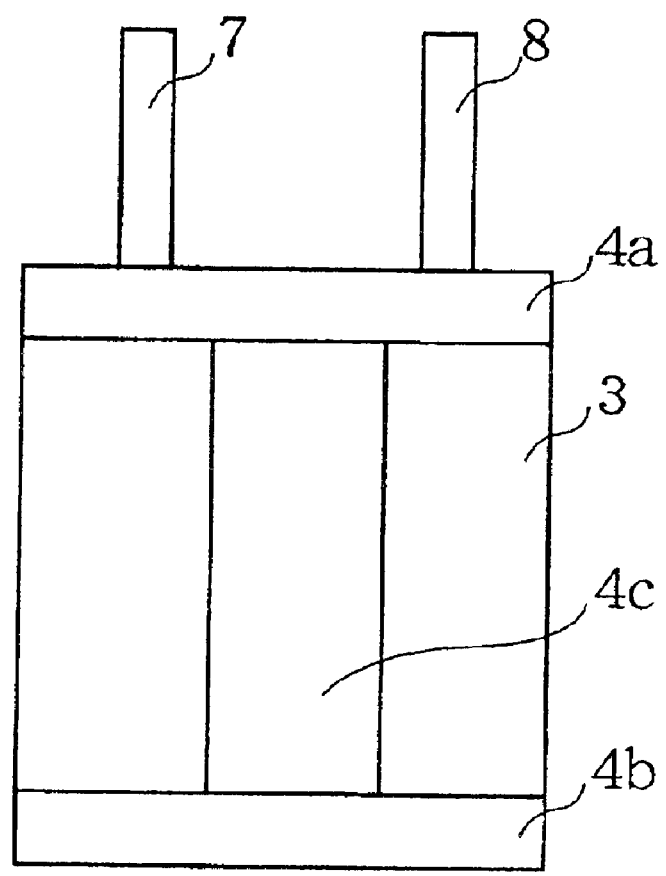
FIG. 3 is a front view of a nonaqueous electrolyte secondary cell of Embodiment 1.

Referring to FIGS. 1 to 3, the method of assembling a cell is described below. First, a positive electrode current collector tab 7 was attached to the substrate of a positive electrode 5 and a negative electrode current collector tab 8 to the substrate of a negative electrode 6. Thereafter, the above-mentioned separator was interposed between the positive electrode and the negative electrode, and these were spirally-wound using a winding machine. Following this, the outermost periphery of the wound assembly was held with tape, and the wound assembly was pressed in a flattened shape to form a plate-like shaped spirally-wound electrode assembly 1.

The plate-like shaped spirally-wound electrode assembly 1 is enclosed in an enclosing space 2 of a laminate outer container 3, which has a cylindrical shape, in such a manner that the positive and negative current collector tabs 7 and 8 protrude outwardly, and then, the opening 4a, which is on the positive and negative current collector tabs 7, 8 side, was heat sealed. Subsequently, 5 ml of the above-described electrolyte solution was poured from the other opening, and thereafter, the opening (4b) was likewise heat sealed. Thus, a nonaqueous electrolyte secondary cell of the present embodiment was fabricated. The actual capacity of the cell thus fabricated was 500 mAh. Note that reference numeral 4c denotes a position to be welded when the laminate material is made into a cylindrical shape.

The cell thus fabricated was hereinafter referred to as a cell A of the present invention.

COMPARATIVE EXAMPLE

A nonaqueous electrolyte secondary cell was fabricated in the same manner as described in the foregoing Embodiment except that the separator employed therein was a microporous film that was made of polyethylene and had micropores with an average diameter of 2 μm (with micropores of this size, lithium dendrites cannot pass therethrough).

The cell thus fabricated is hereinafter referred to as a comparative cell X.

OVERCHARGE TEST

Figure 4:
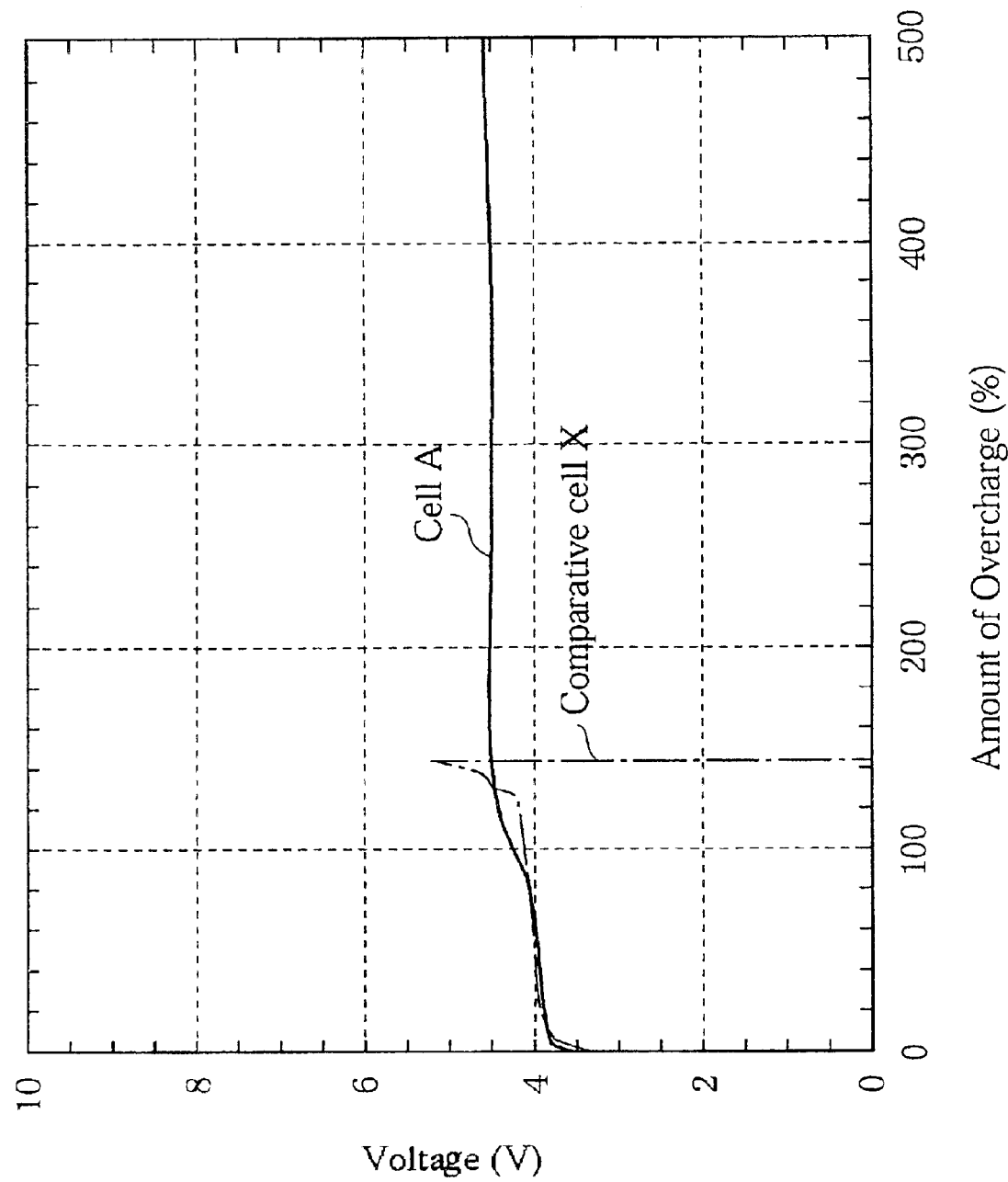
FIG. 4 is a graph showing the relationship between the amount of overcharge and the cell voltage in a cell A of the invention and a comparative cell X.

The cell A of the present invention and the comparative cell X were overcharged at a current of 500 mA (1C) for 5 hours. Using these cells, a relationship between amount of overcharge and cell voltage was studied. The results are shown in FIG. 4. In addition, for each of these cells, the degree of cell thickness expansion and the condition of the sealed potion were examined. The results are shown in the following Table 1.

TABLE 1

| Cell | Cell thickness increase (mm) | Change in the sealing portion |
| --- | --- | --- |
| Cell A | 0.58 | No change |
| Comparative cell X | 23.56 | Detached |

As shown in FIG. 4 and Table 1, the cell A of the present invention, which employs a separator having through holes for passing lithium dendrites therethrough, reached a constant potential in the vicinity of a 150% depth of charge and exhibited very little cell expansion (0.58 mm) and no abnormality in the sealing portion. By contrast, in the comparative cell X, as the charge proceeded, the cell voltage once increased but then dropped, because the comparative cell X employs an ordinary microporous film made of polyethylene and does not have through holes for passing lithium dendrites therethrough. In addition, the comparative cell X showed a significant expansion of 23.56 mm, and moreover, a detachment was recognized in the sealing portion. The detachment in the sealing portion indicates that the cell's hermeticity was impaired.

These results can be explained as follows. In the comparative cell X, as a result of the overcharge, the positive electrode potential exceeded a potential at which the electrolyte solution begins to decompose. Thus, decomposition of the electrolyte solution occurred on the positive electrode, and a gas was formed that caused the expansion of the cell, which in turn caused the detachment in the sealing portion. Furthermore, the deformation of the cell caused a short circuit in the inside of the cell, and cell voltage was thereby increased and then decreased to 0 V.

By contrast, in the cell A of the present invention, at the initial stage of overcharge, lithium dendrites formed on the negative electrode passed through the through holes and reached the positive electrode, causing an internal short circuit, which prevented further overcharge. As a result, an increase in the positive electrode potential stopped, and the amount of the gas formed by decomposition of the electrolyte solution was remarkably reduced. It is to be noted here that, since the dendrites that are formed at the initial stage of overcharge are very small in size, the internal short circuit caused by the dendrites do not cause sudden, excessive electric current flow. Therefore, an increase in cell temperature is small.

It is also noted that such advantageous effects are particularly noticeable in cells that employ aluminum laminate outer containers, which easily deform in response to variation in the internal pressure.

EXPERIMENTS

From the results shown in FIG. 4 and Table 1, it has been confirmed that the use of a separator in which through holes for passing lithium dendrites therethrough are formed can suppress a cell internal pressure n increase caused by overcharge. In addition, further preferable conditions have been studied, and the results are discussed below.

Experiment 1

Figure 5:
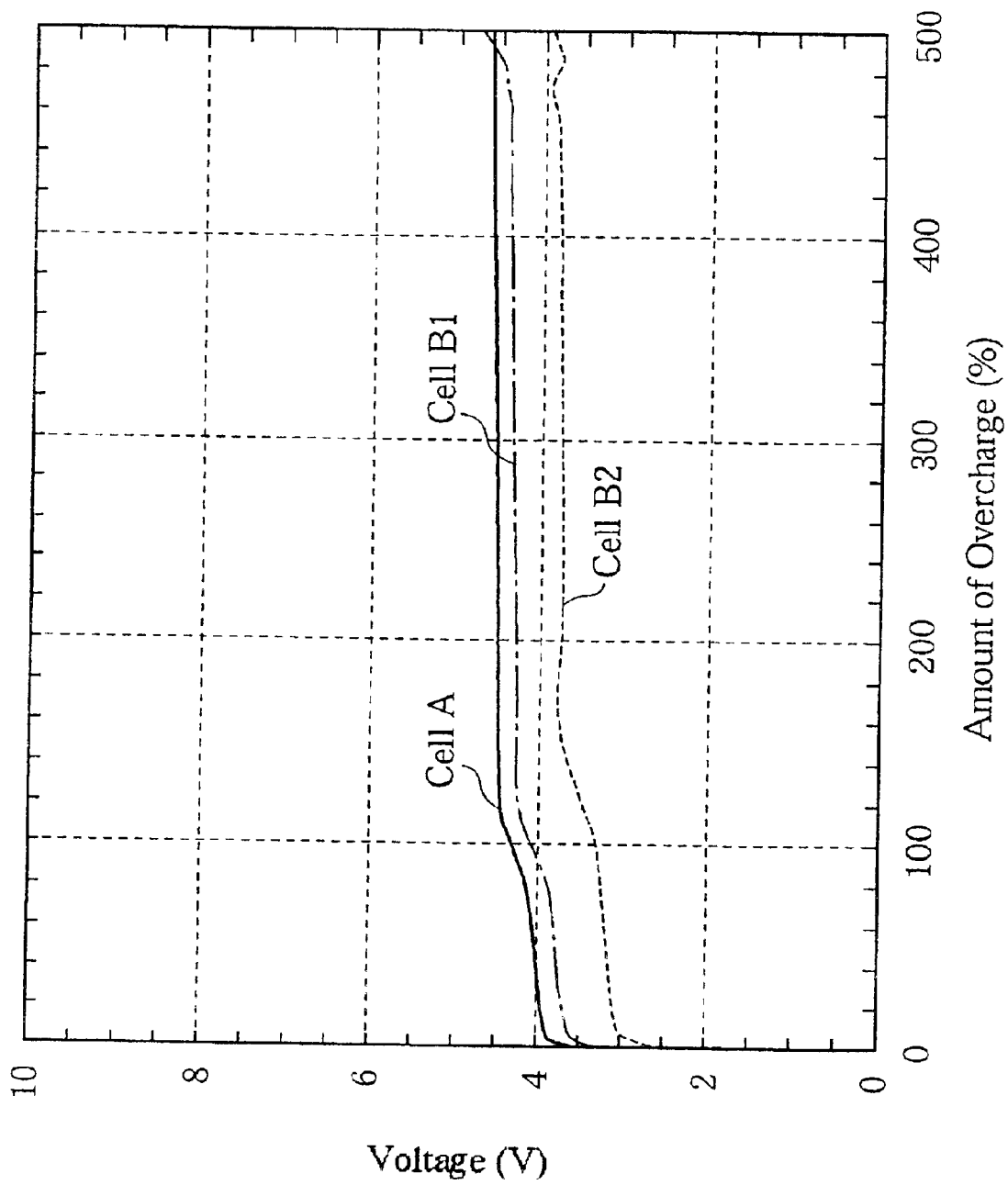
FIG. 5 is a graph showing the relationship between the amount of overcharge and the cell voltage in Experiment 1.

In Experiment 1, a relationship between types of negative electrode active materials and overcharge characteristics was studied. Specifically, nonaqueous electrolyte secondary cells (cells B1 and B2 of the present invention) were fabricated in the same manner as described in the foregoing Embodiment except that tin oxide or silicon was employed as the negative electrode active material, as shown in Table 2. Using these cells B1 and B2 in addition to the cell A, an overcharge test was conducted in the same manner as described in the foregoing Embodiment to study a relationship between the amount of overcharge and the cell voltage, the results of which are shown in FIG. 5. The thickness of the coating applied on the negative electrodes was determined according to a theoretical capacity such that each of the cells has the same capacity per unit area, and the positive and negative electrode capacity ratio (the capacity of the negative electrode/the capacity of the positive electrode) was adjusted to be

TABLE 2

| Cell | Type of negative electrode active material |
| --- | --- |
| Cell A | graphite |
| Cell B1 | silicon |
| Cell B2 | tin oxide |

As clearly seen from FIG. 5, it was observed that, in all the cells A, B1, and B2 of the present invention, the cell voltage curves flattened out from the vicinity of a 150% depth of charge. The reason is that, because all of these cells have the same positive and negative electrode capacity ratio, in all the negative electrodes of these cells, lithium dendrite deposition occurs at the same depth of charge of the positive electrodes. It is considered that the cell voltages at which the voltage curves flattens out vary between the cells because the potentials of the negative electrodes in the fully charged condition vary between the cells.

Although not detailed here, it has been proved by an experiment that substantially the same results are obtained when lithium nickel oxide or lithium manganese oxide is used as the positive electrode active material in place of lithium cobalt oxide.

Experiment 2

Figure 6:
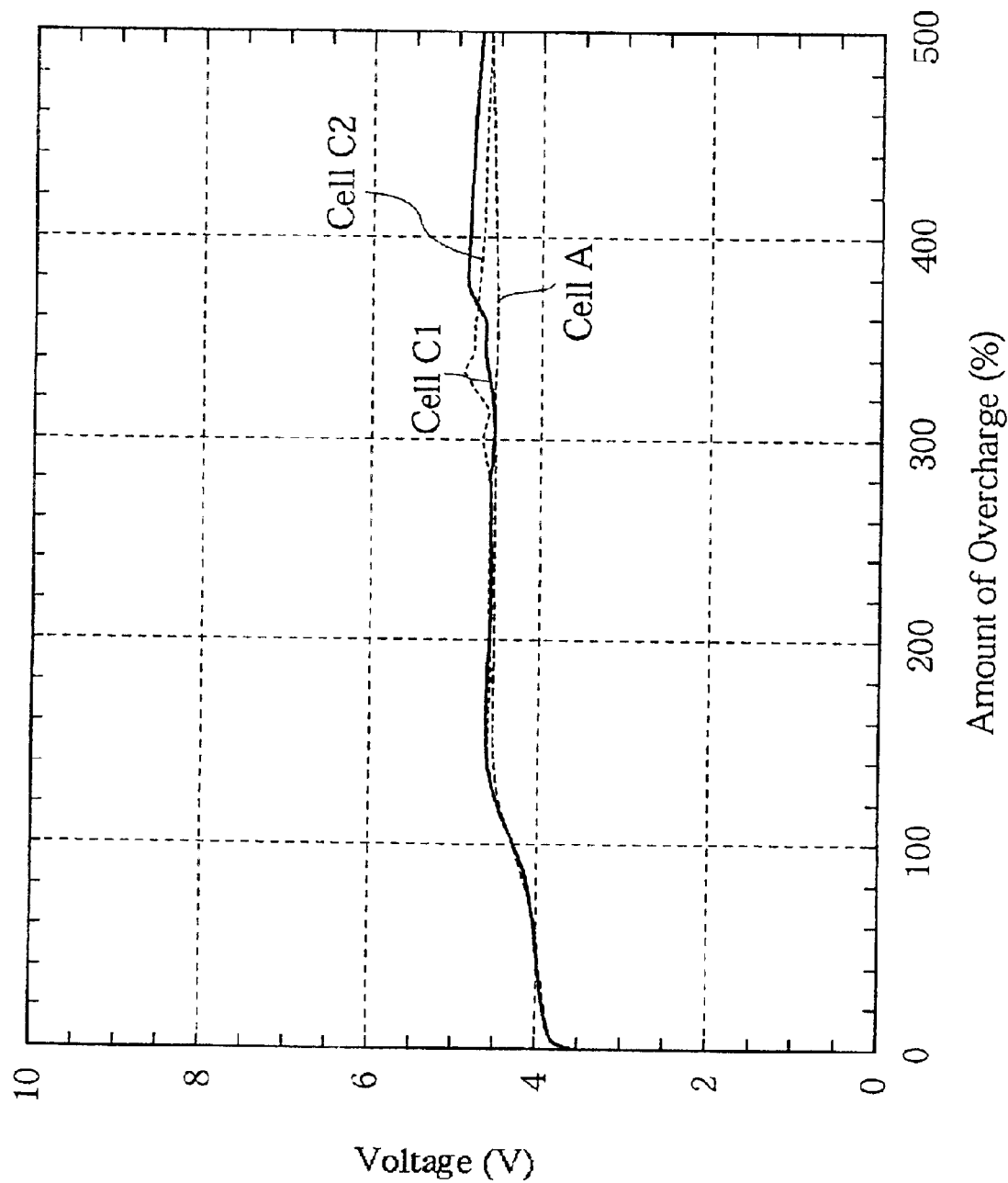
FIG. 6 is a graph showing the relationship between the amount of overcharge and the cell voltage in Experiment 2.

In Experiment 2, a relationship between methods of forming the through holes and overcharge characteristics was studied. Specifically, nonaqueous electrolyte secondary cells (cells C1 and C2 of the present invention) were fabricated in the same manner as described in the foregoing Embodiment except that the through holes were formed by an electrical processing method or a mechanical method using needles, as shown in Table 3. Using these cells C1 and C2 in addition to the cell A, an overcharge test was conducted in the same manner as described in the foregoing Embodiment to study a relationship between the amount of overcharge and the cell voltage, the results of which are shown in FIG. 6. The electric treatment method may be a glow discharge method, an atmospheric pressure low temperature plasma treatment method, or the like. In the present experiment, an atmospheric pressure low temperature plasma treatment method was employed.

TABLE 3

| Cell | Method of forming through holes |
| --- | --- |
| Cell A | KrF excimer laser |
| Cell C1 | atmospheric pressure low temperature treatment |
| Cell C2 | mechanical method using needles |

As clearly seen from FIG. 6, in the cells C1 and C2 of the present invention as well as the cell A of the present invention, the cell voltage became constant at 4.6 to 4.7 V from the vicinity of a 150% depth of charge, and after the test, little deformation was observed in the cells. From these results, it has been found that, irrespective of the methods of forming through holes, electrical contact caused by lithium dendrite formation is produced insofar as through holes for passing lithium dendrites therethrough are formed in the separator.

Although not detailed here, it has been proved by an experiment that substantially the same results are obtained when a nonwoven fabric made of polyethylene terephthalate and having similar through holes is used as the separator.

Experiment 3

Figure 8:
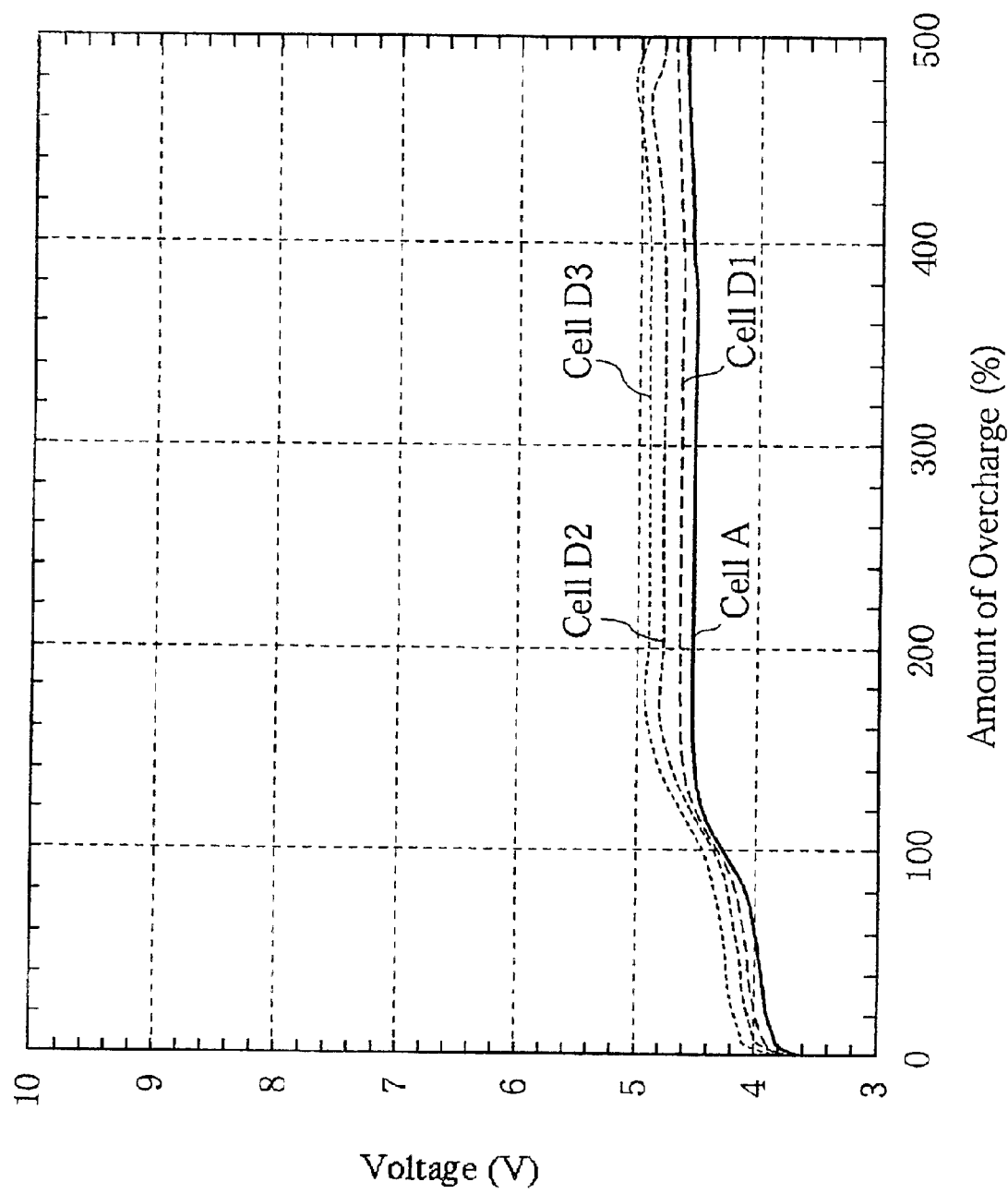
FIG. 8 is a graph showing the relationship between the amount of overcharge and the cell voltage in Experiment 3.

In Experiment 3, a relationship between orientations of through holes and overcharge characteristics was studied. Specifically, nonaqueous electrolyte secondary cells (cells D1 to D3 of the present invention) were fabricated in the same manner as described in the foregoing Embodiment except that the orientations of the through holes were such that the angles θ of through holes with respect to the negative electrode surface were 60°, 45°, and 30°, respectively, as shown in Table 4 below. Using these cells D1 to D3 in addition to the cell A, an overcharge test was conducted in the same manner as described in the foregoing Embodiment to study a relationship between the amount of overcharge and the cell voltage, the results of which are shown in FIG. 8.

TABLE 4

Figure 7B:
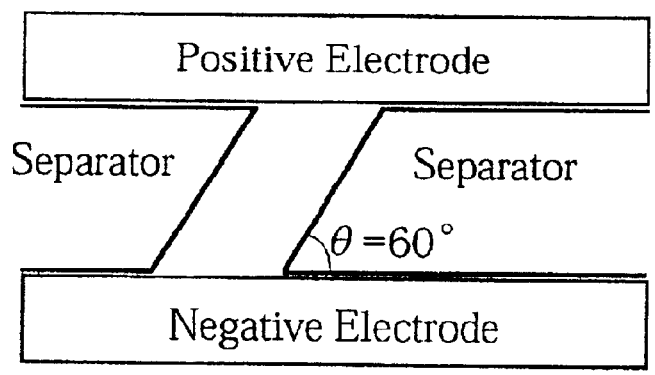
Figure 7C:
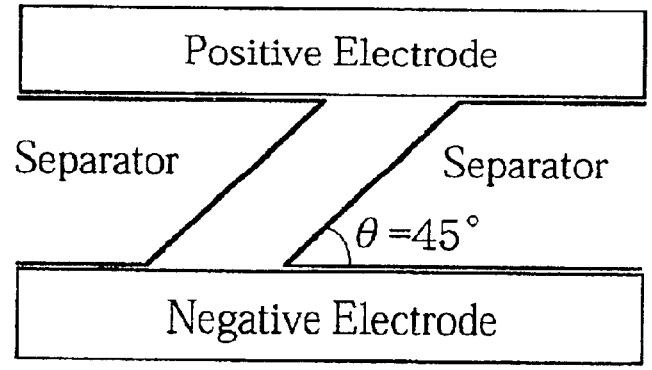

| Cell | Orientation of through holes |
| --- | --- |
| Cell A | angle of through hole with respect to the surface of the negative electrode θ = 90° (With this orientation, the positive electrode and the negative electrode are connected in the shortest distance. See FIG. 7A) |
| Cell D1 | angle of through hole with respect to the surface of the negative electrode θ = 60° (See FIG. 7B) |
| Cell D2 | angle of through hole with respect to the surface of the negative electrode θ = 45° (See FIG. 7C) |

TABLE 4-continued

Figure 7D:
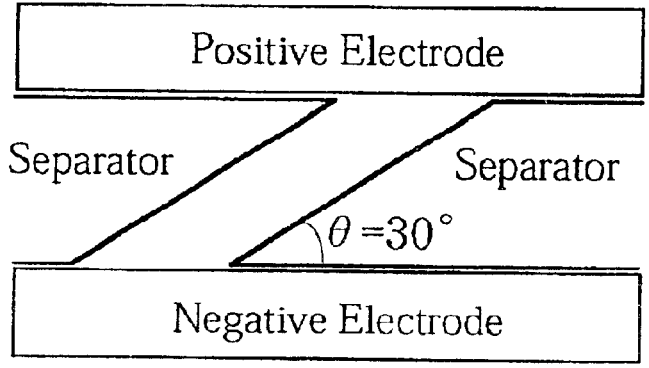

| Cell | Orientation of through holes |
|---|---|
| Cell D3 | angle of through hole with respect to the surface of the negative electrode θ = 30° (See FIG. 7D) |

As clearly seen from FIG. 8, in the cell A, the cell voltage curve flattened out at 4.6–4.7V from the vicinity of a 150% depth of charge. In the cells D1 to D3 of the present invention, the depths of charge at which the cell voltage curves flattened out increased progressively to 160%, 175%, and 185%, respectively, and the cell voltages at which the cell voltage curves flattened out also increased by increments of about 0.1 V. These results can be explained as follows. As the angle of a through hole in the separator with respect to a direction by which the positive electrode and the negative electrode are connected in the shortest possible distance increases, the length of the through hole accordingly increase, in which case lithium dendrites need to grow further in order to connect the positive electrode and the negative electrode, and therefore, unless a further charged state is reached, the electrical contact resulting from the dendrites cannot be established.

Experiment 4

Figure 9:
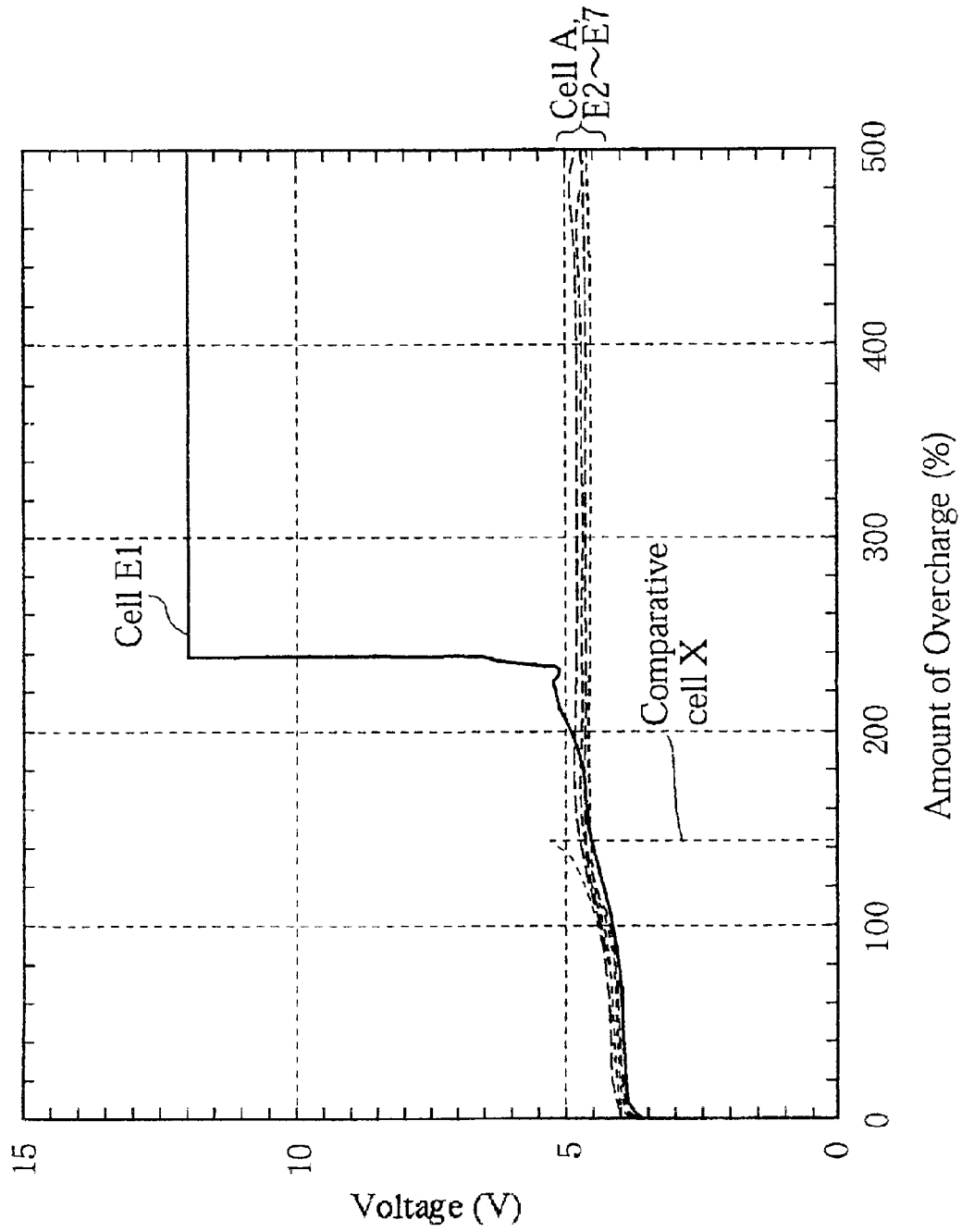
FIG. 9 is a graph showing the relationship between the amount of overcharge and the cell voltage in Experiment 4.

In Experiment 4, a relationship between diameters of through holes and overcharge characteristics was studied. Specifically, nonaqueous electrolyte secondary cells (cells E1 to E7 of the present invention) were fabricated in the same manner as described in the foregoing Embodiment except that the diameters of the through holes were 3 µm, 5 µm, 20 µm, 30 µm, 50 µm, 100 µm, and 200 µm, respectively, as shown in Table 5 below. Using these cells E1 to E7 in addition to the cell A, an overcharge test was conducted in the same manner as described in the foregoing Embodiment to study a relationship between the amount of overcharge and the cell voltage, the results of which are shown in FIG. 9. The diameters of the through holes were varied by varying the hole diameters of the stainless steel mask used when the KrF excimer laser processing was performed.

TABLE 5

| Cell | Diameter of through holes |
|---|---|
| Cell E1 | 3 µm |
| Cell E2 | 5 µm |
| Cell A | 10 µm |
| Cell E3 | 20 µm |
| Cell E4 | 30 µm |
| Cell E5 | 50 µm |
| Cell E6 | 100 µm |
| Cell E7 | 200 µm |
| Comparative cell X | Ordinary microporous film |

As clearly seen from FIG. 9, in the cell A and cells E2 to E7 of the present invention, in which the diameter of the through holes is 5 µm or greater, the cell voltage curves flattened out from the vicinity of a 150% depth of charge, and the cell voltages became constant at 4.5–4.7 V. In the cell E1 of the present invention, in which the diameter of the through holes is 3 µm, the cell voltage increased as the charge proceeded, and the cell voltage reached 12 V, the upper limit of the power source for charging, at about 220% depth of charge.

In cases where lithium dendrites that deposit on the negative electrode in an overcharge condition reach the positive electrode through the separator, the dendrites grow in the form of needle-like shaped crystals with certain diameters. For this reason, when the diameter of the through holes is too small (less than 5 µm), the lithium dendrites are difficult to grow into the separator, and consequently, there are cases in which electrical contact between the positive electrode and the negative electrode cannot be established. As a result, overcharge reaction proceeds to a certain degree, increasing the positive electrode potential. By contrast, when the diameter of the through holes is sufficiently large (5 µm or larger), a smooth internal electrical conduction by lithium dendrites is formed due to the presence of through holes, regardless of the sizes of the through holes.

In the comparative cell X, which employs an ordinary microporous film, it was recognized that short circuits were caused by deformation of the cell, which is due to gas formation resulting from an increase of positive electrode potential.

Experiment 5

In Experiment 5, a relationship between diameters of through holes and rates of defectives was studied. Specifically, nonaqueous electrolyte secondary cells (cells F1 to F7 of the present invention) were fabricated in the same manner as described in the foregoing Embodiment except that the diameters of the through holes were 5 µm, 20 µm, 30 µm, 50 µm, 70 µm, 100 µm, and 200 µm, respectively, as shown in Table 6 below. Using these cells E1 to E7 in addition to the cell A, the rates of defectives were examined in relation to the diameters of through holes, the results of which are shown in Table 6 below and FIG. 10 The number of the samples was 500 per each of the cells.

TABLE 6

| Cell | Diameter of through holes | Rate of defectives |
|---|---|---|
| Cell F1 | 5 µm | 0% |
| Cell A | 10 µm | 0% |
| Cell F2 | 20 µm | 0% |
| Cell F3 | 30 µm | 0% |
| Cell F4 | 50 µm | 0% |
| Cell F5 | 70 µm | 0% |
| Cell F6 | 100 µm | 0.2% |
| Cell F7 | 200 µm | 2.5% |

Figure 10:
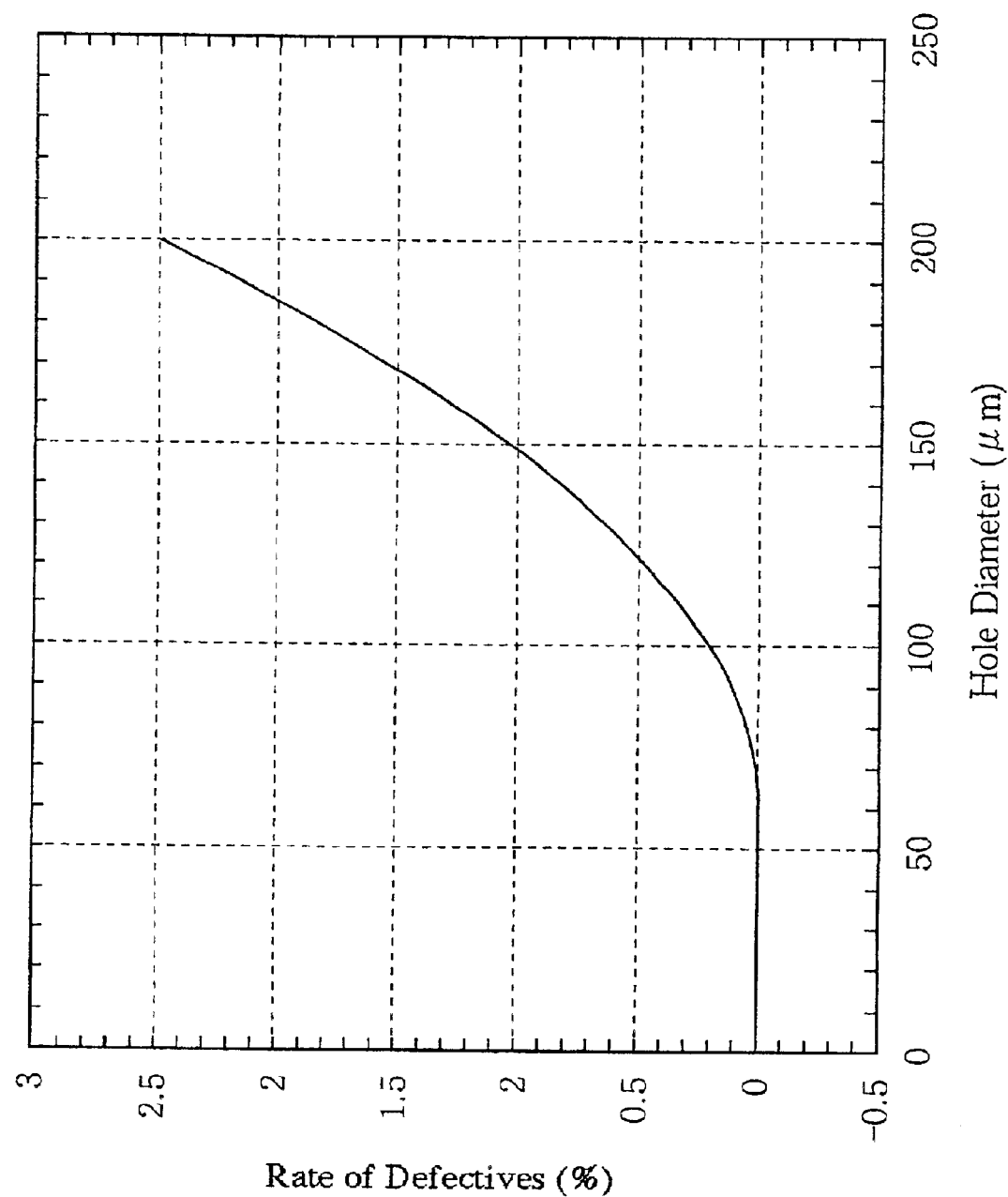
FIG. 10 is a graph showing the relationship between through hole diameters and rates of defectives in Experiment 5.

As clearly seen from Table 6 and FIG. 10, in the cells F1 to F5 and A of the present invention, in which the diameters of the through holes are 70 µm or less, no defective cell was produced. In the cell F6 of the invention, in which the diameter of the through holes was 100 µm, a few defectives were produced but the proportion was at an acceptable level for practical use. In the cell F7 of the invention, in which the diameter of the through holes was 200 µm, a noticeable number of defectives were produced, and the proportion was at a level that is somewhat of a problem for practical use.

In view of this, the cause of such defective occurrence was investigated. As a result, it was found by disassembling the defective cells that, since the mechanical strength of the separator was considerably weaker in the cells having large through hole diameters, the tension applied to the separator during the making of the wound component (the electrode assemblies) caused partial breakage in the separator, which consequently caused short circuits in the inside of the cell.

Experiment 6

In Experiment 6, a relationship between time of heating of cells and internal resistance was studied. Specifically, nonaqueous electrolyte secondary cells (cells G1 to G5 of the present invention) were fabricated in the same manner as described in the foregoing Embodiment except that the diameters of the through holes were 5 µm, 30 µm, 50 µm, 70 µm, and 100 µm, respectively, as shown in Table 7 below.

These cells were fully charged at 4.2 V, thereafter heated to 150° C., and then set aside at 150° C. In this condition, the relationship between the time of heating and the internal resistance was examined, the results of which are shown in FIG. 11.

TABLE 7

| Cell | Diameter of through holes |
| --- | --- |
| Cell G1 | 5 μm |
| Cell G2 | 30 μm |
| Cell G3 | 50 μm |
| Cell G4 | 70 μm |
| Cell G5 | 100 μm |

Figure 11:
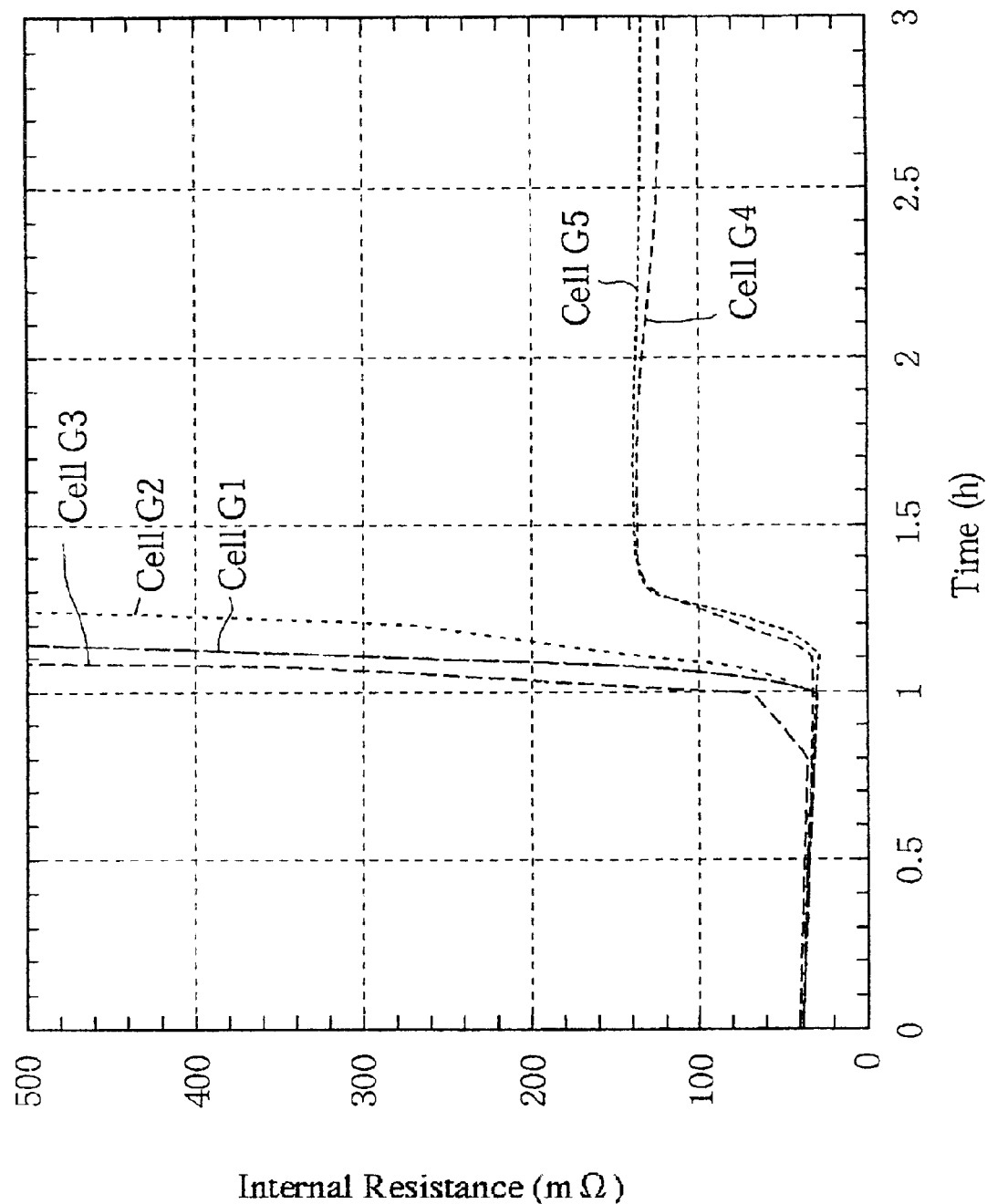
FIG. 11 is a graph showing the relationship between time and internal resistance in Experiment 6.

As clearly seen from FIG. 11, in the cells G1 to G3 of the present invention, in which the diameters of the through holes are 50 μm or less, the internal resistance abruptly increased after about 1 hour from the start of the heating. By contrast, the cells G4 and G5 of the present invention, in which the diameter of the through holes is 70 μm or larger, showed a gradual increase of the internal resistance caused by a temperature increase accompanied by the heating, and the internal resistance became constant at about 130 mΩ.

A shutdown mechanism, in which the separator, which is composed of a microporous film made of polyethylene, melts in cases where a cell temperature increase occurs and thereby prevents current flow between the positive electrode and the negative electrode, is an important function required of the separator. In cases where the diameter of the through holes is small, it is possible that the polyethylene that has melted around the through holes plugs up the through holes. On the contrary, in cases where through holes having a hole diameter larger than a certain value (a diameter larger than 50 μm) are present, the molten polyethylene around the through holes cannot plug the through holes and therefore it is physically impossible to cause a shutdown by heating. For this reason, in such cases of a rapid temperature increase caused by external short circuits, a problem is caused such that, although the shutdown occurs in the portion of ordinary micropores, the through holes remain unplugged and therefore, safety of the cells may become inferior to those in which the shutdown perfectly occurs.

Experiment 7

In Experiment 7, a relationship between diameters of through holes and cell voltage variations and cell thickness increases was studied. Specifically, nonaqueous electrolyte secondary cells (cells H1 to H3 of the present invention) were fabricated in the same manner as described in the foregoing Embodiment except that the diameters of the through holes were 5 μm, 30 μm, and 50 μm, respectively, as shown in Table 8 below. These cells H1 to H3 in addition to the cell A were stored in a constant temperature bath having a temperature of 60° C. for 20 days, and thereafter, voltage variation and cell thickness increase of these cells were measured. The results are shown in the following Table 8.

TABLE 8

| Cell | Diameter of through holes | Cell voltage variation | Cell thickness increase |
| --- | --- | --- | --- |
| Cell H1 | 5 μm | −0.32 V | 0.025 mm |
| Cell A | 10 μm | −0.34 V | 0.028 mm |
| Cell H2 | 30 μm | −0.35 V | 0.030 mm |
| Cell H3 | 50 μm | −1.56 V | 0.358 mm |
| Comparative cell X | ordinary microporous film | −0.28 V | 0.023 mm |

As clearly seen in Table 8, the cells A, H1, and H2 of the invention, in which the diameters of the through holes are 30 μm or less, exhibited results comparable to those of the comparative cell X in terms of cell voltage variation and cell thickness increase, and degradation caused by the presence of the through holes was not recognized. By contrast, the cell H3 of the invention, in which the diameter of the through holes is 50 μm, showed noticeable increases over the comparative cell X in terms of both cell voltage variation and cell thickness increase.

From these results, it is concluded that there is a tendency that the larger the diameter of the through holes is, the greater the cell degradation resulting from the self-discharge during storage. It is also concluded that, when the diameter of the through holes is in the range of 30 μm or less, no degradation that causes problems in actual use is induced, whereas, when the diameter of the through holes exceeds 30 μm, such degradation that causes problems in actual use is induced.

The specific causes of these results of the experiment are not yet clear at present, but it is supposed that the differences in the tendency of the electrophoresis of lithium ions through the through holes that takes place in the electrolyte solution and the influence of the active material detached from the electrode plates may be responsible for the results described above.

Experiment 8

Figure 12:
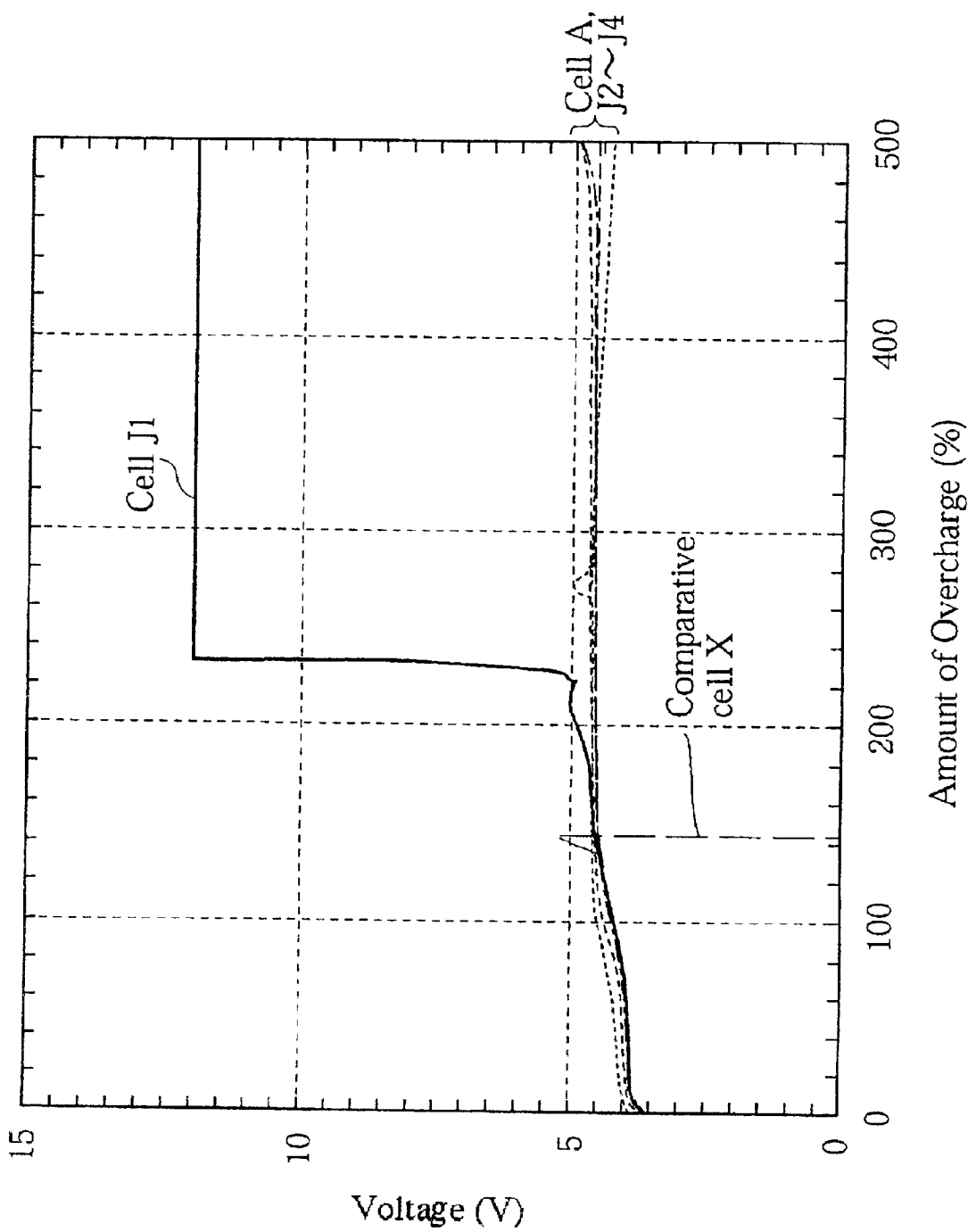
FIG. 12 is a graph showing the relationship between the amount of overcharge and the cell voltage in Experiment 8.

In Experiment 8, a relationship between densities of through holes and overcharge characteristics was studied. Specifically, nonaqueous electrolyte secondary cells (cells J1 to J4 of the present invention) were fabricated in the same manner as described in the foregoing Embodiment except that the densities of the through holes were 0.5 through holes/cm$^2$, 1 through hole/cm$^2$, 1.5 through holes/cm$^2$, and 4 through holes/cm$^2$, respectively, as shown in Table 9 below. Using these cells J1 to J4 in addition to the cell A, an overcharge test was conducted in the same manner as described in the foregoing Embodiment to study a relationship between the amount of overcharge and the cell voltage, the results of which are shown in FIG. 12. All the cells had a configuration in which the through holes were uniformly dispersed.

TABLE 9

| Cell | Density of through holes |
| --- | --- |
| Cell J1 | 0.5 through holes/cm$^2$ |
| Cell J2 | 1 through hole/cm$^2$ |
| Cell J3 | 1.5 through holes/cm$^2$ |
| Cell A | 2 through holes/cm$^2$ |
| Cell J4 | 4 through holes/cm$^2$ |
| Comparative cell X | ordinary microporous film |

As clearly seen from FIG. 12, in the cells J2 to J4 of the present invention, although it was observed that the cell voltage curves flattened out, the greater the densities of the through holes were, the depths of charge at which the cell voltage curves flattened out were shallower and the cell voltages were lower. By contrast, in the cell J1 of the present invention, as the charge proceeded, the cell voltage increased and finally reached 12 V, the upper limit of the power source for charging, at about 230% depth of charge. These results can be explained as follows. The lithium dendrites formed on the negative electrode in an overcharge condition are not uniformly formed on the surface of the negative electrode at the initial stage of the deposition but begins to selectively deposit at the positions where the reaction is active. At the positions where the deposited dendrites and the through holes in the separator match, it is possible for the dendrites to reach the positive electrode through the separator. To match the positions where the dendrites deposit with the positions where the through holes are present, it is desirable that the though holes be present at a density of one through hole/cm$^2$ or more. If the density is less than one through hole/cm$^2$, the dendrites formed at the initial stage of the deposition cannot reach the positive electrode and consequently a cell voltage increase is caused.

In the comparative cell X, which employs an ordinary microporous film, it was found that short circuits occurred due to the deformation of the cell that was caused by gas formation resulting from the cell voltage increase.

Experiment 9

Figure 13:
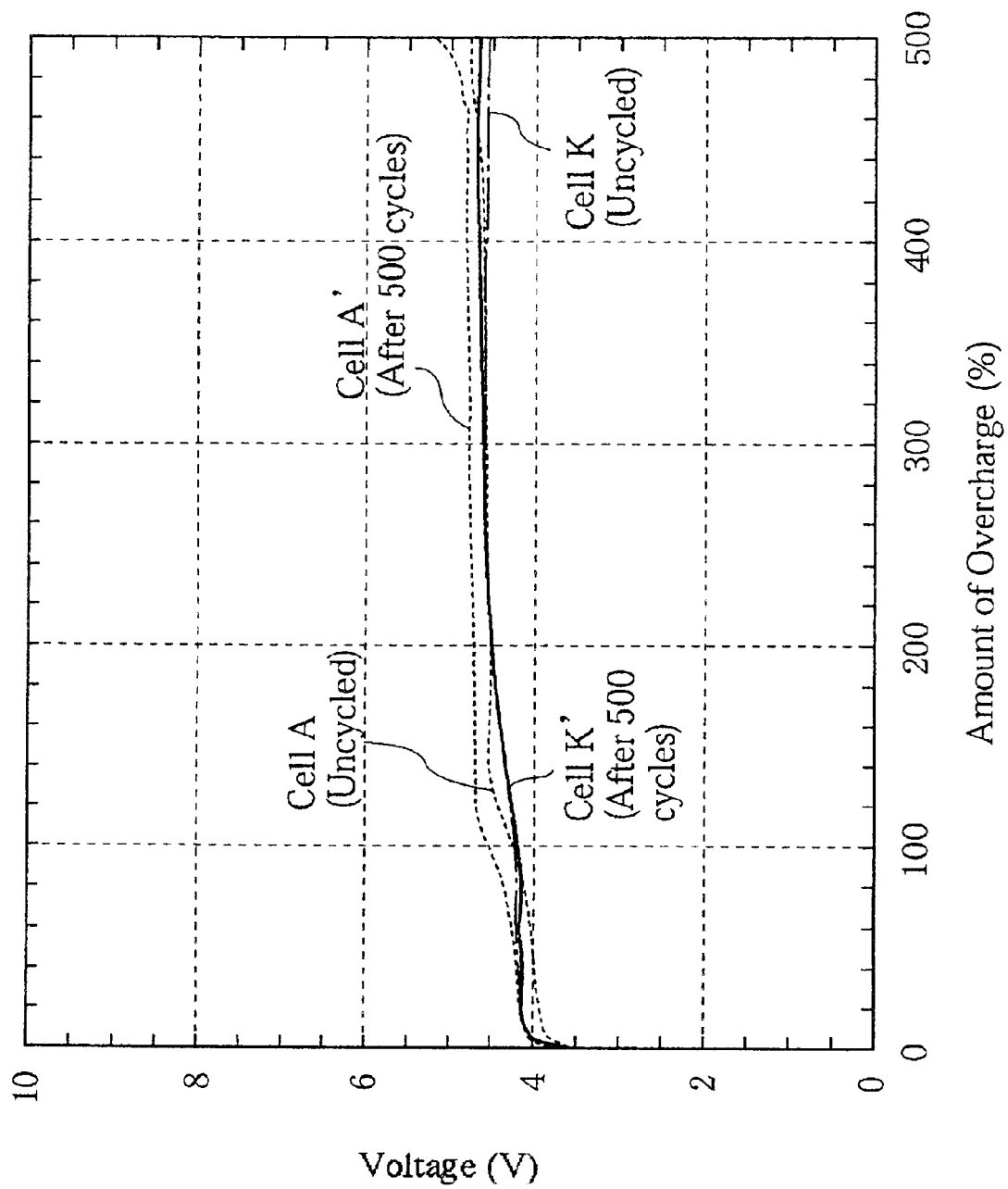
FIG. 13 is a graph showing the relationship the amount of overcharge and the cell voltage in Experiment 9.

In Experiment 9, a relationship between types of electrolytes and overcharge characteristics was studied using a cell which employs an electrolyte solution and a cell which employs a gel polymer. Specifically, nonaqueous electrolyte secondary cells (cell K of the present invention) were fabricated in the same manner as described in the foregoing Embodiment except that a polyethylene oxide-based gel polymer was employed for the electrolyte, as shown in Table 10 below. Using these cells, a sample that underwent 500 charge-discharge cycles at room temperature and a sample that was not cycled after the fabrication were prepared, and an overcharge test was conducted in the same manner as described in the foregoing Embodiment to study a relationship between the amount of overcharge and the cell voltage, the results of which are shown in FIG. 13. The polyethylene oxide-based gel polymer used in the present experiment was such that the same electrolyte solution as the one described in the foregoing Embodiment and a monomer were retained at a ratio of 12:1.

The term "gel polymer" refers to a type of conductive polymer that shows lithium ionic conductivity, and examples thereof include polyethylene oxide (PEO), polyvinylidene fluoride (PVdF), polymethyl methacrylate (PMMA), and the like.

TABLE 10

| Cell | Electrolyte | Charge-discharge cycles |
| --- | --- | --- |
| Cell A | Solution | Uncycled |
| Cell A' | Solution | 500 cycles |
| Cell K | Gel polymer | Uncycled |
| Cell K' | Gel polymer | 500 cycles |

As clearly seen from FIG. 13, in the cell K (uncycled) and K' (after 500 cycles) of the invention, which employed the gel polymer, the cell voltage curves flattened out in the vicinity of a 200% depth of charge, and the cell voltage at which the curve flattened out was about 4.7 V. By contrast, in the cell A (uncycled) of the invention, which employed an electrolyte solution, the cell voltage curve flattened out from the vicinity of a 150% depth of charge and the cell voltage at which the cell voltage curve flattened out was about 4.7 V, while in the cell A' (after 500 cycles), the cell voltage curve flattened out in the vicinity of a 140% depth of charge and the cell voltage at which the cell voltage curve flattened out was about 4.9 V, higher than that of the cell A.

The cells before and after the cycles were disassembled and examined. As a result, the following were found. In the cell A' (after 500 cycles), which employs an electrolyte solution, the deposit resulting from the decomposition of the electrolyte solution and the active material detached from the electrode plate, which were created by repeating charge-discharge cycles, were observed on the separator. In the cell A (uncycled), which employs an electrolyte solution, no deposit was observed on the separator. By contrast, in the cells K (uncycled) and K' (after 500 cycles) of the invention, which employ a gel polymer, the decomposed product and the detached active material were held by the gel polymer and very little deposit was observed on the separator.

In the cell A' (after 500 cycles) of the invention, as described above, the deposit that attaches onto the separator plugs up the through holes. Therefore, lithium dendrites that are formed on the negative electrode in an overcharge condition need to grow more than is normal in order to reach the positive electrode. In the case where a charge that is required for such a growth has proceeded, a cell voltage increase occurs. On the other hand, in the cell A (uncycled) of the invention, which employs an electrolyte solution, since there is no deposit attached on the separator, it is not necessary for the lithium dendrites to grow more than is normal and consequently no voltage increase occurs.

By contrast, in the cells K (uncycled) and K' (after 500 cycles), since no deposit attaches onto the separator, the through holes are not plugged up and a cell voltage increase as described above does not occur.

For these reasons, the experiment yielded the results as described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed a being included therein.

What is claimed is:

1. A nonaqueous electrolyte secondary cell comprising a positive electrode, a negative electrode, a nonaqueous electrolyte, a separator interposed between the positive electrode and the negative electrode, the positive electrode having a positive electrode active material comprising a chemical compound capable of reversibly intercalating lithium and the negative electrode having a negative electrode active material comprising a material capable of reversibly intercalating lithium, wherein the separator has through holes for passing lithium dendrites therethrough;

wherein the through holes have a diameter of 5 μm to 100 μm; and wherein the through holes have a substantially straight line-shape extending completely through the separator and the positive electrode and the negative electrode are connected thereby.

2. The nonaqueous electrolyte secondary cell according to claim 1, wherein the through holes are such that the positive electrode and the negative electrode are connected in the shortest possible distance.

3. The nonaqueous electrolyte secondary cell according to claim 1, wherein the through holes have a maximum diameter of 30 μm.

4. The nonaqueous electrolyte secondary cell according to claim 2, wherein the through holes have a maximum diameter of 30 μm.

5. The nonaqueous electrolyte secondary cell according to claim 1, further comprising a conductive polymer provided between the separator and the positive and negative electrode active materials.

6. A nonaqueous electrolyte secondary cell comprising a positive electrode, a negative electrode, a nonaqueous electrolyte, a separator interposed between the positive electrode and the negative electrode, the positive electrode having a positive electrode active material comprising a chemical compound capable of reversibly intercalating lithium and the negative electrode having a negative electrode active material comprising a material capable of reversibly intercalating lithium, wherein the separator has through holes for passing lithium dendrites therethrough;

wherein the through holes have a diameter of 5 $\mu$m to 100 $\mu$m;

wherein the through holes are provided at a density of one through hole to four through holes per square centimeter; and wherein the through holes have a substantially straight line-shape extending completely through the separator and the positive electrode and the negative electrode are connected thereby.

7. The nonaqueous electrolyte secondary cell according to claim 6, wherein the through holes are such that the positive electrode and the negative electrode are connected in the shortest possible distance.

8. The nonaqueous electrolyte secondary cell according to claim 6, wherein the through holes have a maximum diameter of 30 $\mu$m.

9. The nonaqueous electrolyte secondary cell according to claim 7, wherein the through holes have a maximum diameter of 30 $\mu$m.

10. The nonaqueous electrolyte secondary cell according to claim 6, further comprising a conductive polymer provided between the separator and the positive and negative electrode active materials.

* * * * *